March 31, 1931. L. F. CLEMENTS 1,798,971
OCCUPANT PROPELLED VEHICLE
Filed Dec. 14, 1928
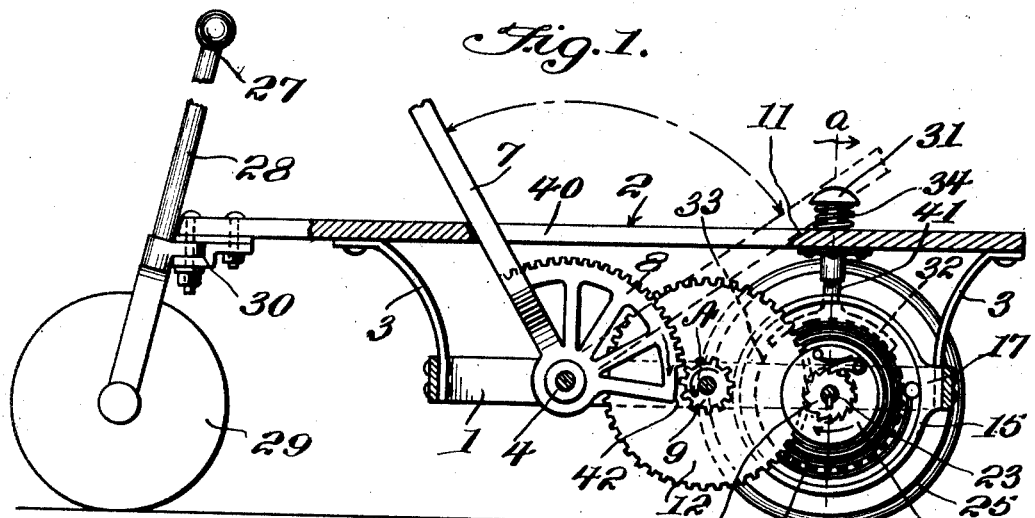
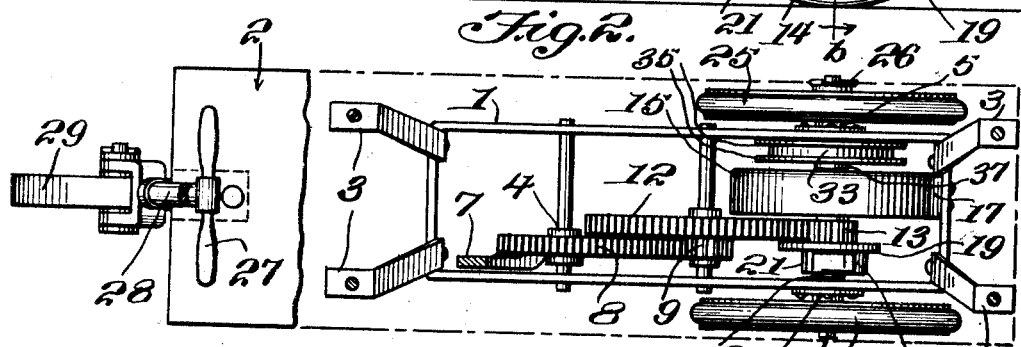
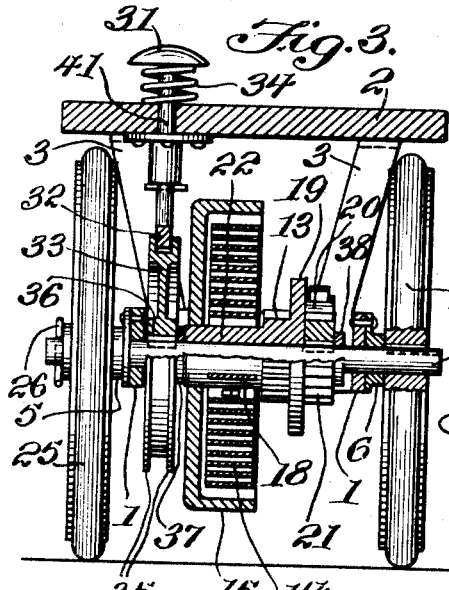
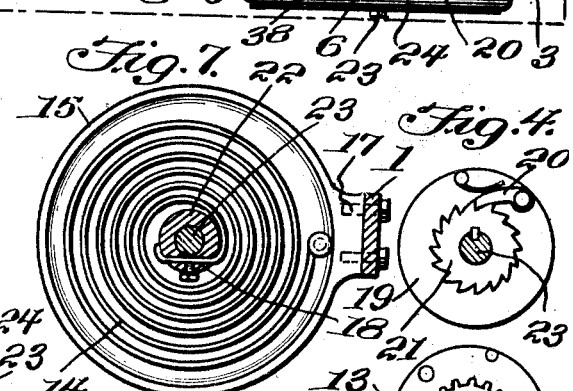
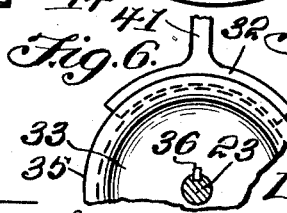
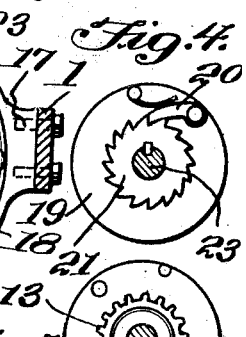
Inventor
L. F. Clements
By Spear, Middleton, Donaldson & Hall
ATTORNEYS Patented Mar. 31, 1931

1,798,971

UNITED STATES PATENT OFFICE

LOUIS F. CLEMENTS, OF PUEBLO, COLORADO

OCCUPANT-PROPELLED VEHICLE

Application filed December 14, 1928. Serial No. 326,047.

This invention relates to improvements in vehicles and more particularly to occupant propelled vehicles.

An object of the invention is to provide a scooter adapted to be operated by an operator in standing position.

Another object is to provide spring means for driving the vehicle, the spring to be wound by a single rearward movement of a foot-operated lever, and to unwind to drive the vehicle forward and to return the lever to forward position.

A further object is to provide means for driving the vehicle including spring means wound by a single stroke of a lever in one direction and adapted to unwind upon release of the lever to drive the vehicle, including means to permit free coasting.

Other objects will appear hereinafter.

The invention consists in the features, combination, and arrangement of parts hereinafter described and particularly pointed out in the claims.

In the drawings:

Figure 1 is a side elevation of the vehicle with one wheel and the left side of the frame removed showing the motive power and gearing in relative position, with the lever in forward position.

Fig. 2 is a top plan view of the scooter with the platform cut away except at the front, the lines at the side indicating the border of the platform.

Fig. 3 is a view looking toward the rear of my device with parts shown in section, one wheel being shown partly in section and the other in elevation, the frame platform and spring housing being shown in section. The ratchet, pinion, shaft, and brake mechanism are shown partly in elevation. The parts in section are on line $a$—$b$ in Fig. 1.

Fig. 4 is a detail view of the pawl and ratchet, and disc to which the pinion is attached.

Fig. 5 is a detail view of the opposite side of the disc to which the pinion is attached.

Fig. 6 is a detail of the brake mechanism.

Fig. 7 is a view of the spring and housing.

Referring to the drawings, 1 represents the frame of the vehicle and 2 the flat platform mounted on brackets 3 secured to the frame. The frame 1 provides bearing 4 for the operating lever 7, and bearings 5 and 6 for the rear axle shaft 23.

At the front end of the scooter is provided steering mechanism comprising handle 27, steering post 28, carrying wheel 29 and secured to the platform at joint 30.

The axle shaft 23 rotates in bearings 5 and 6 in the frame 1 and rear wheel 24 is rigidly secured thereto while rear wheel 25 is loosely mounted thereon and held in place by means of cotter pin 26.

Carried by the shaft and keyed thereto is ratchet wheel 21. Loosely mounted on the shaft 23 for rotation relative thereto is pinion 13 carrying rigidly secured thereto the disc 19 having spring pressed pawl 20 thereon adapted to engage the teeth of the ratchet wheel 21.

The pinion 13 has a spindle or bushing 22 projecting from its opposite side into a spring cup or housing 15 which is fixed to the frame at 17. The spring 14 is coiled in said housing about said shaft and has its inner end attached to said spindle 22 through slot 18 therein and has its outer end fixed in housing 15 so that rearward rotation of the pinion 13 will wind up the spring about the bushing.

A lever 7 is pivotally mounted to the frame 1 at 4 for swinging movement forward and backward in a slot 40 in the platform and multiplying gearing is provided between the lever 7 and the pinion 13 whereby to wind up the spring by a single rearward stroke of the lever. The lever is adapted be foot or hand operated.

The lever 7 carries a segmental gear 8 engaging, when depressed, with an intermediate pinion 9 mounted on the frame 1. The pinion 9 carries integral therewith the intermediate gear 12 which in turn meshes with the pinion 13.

A rearward movement of the lever will rotate the multiplying gearing to wind up the spring.

The shaft carries a brake drum 33 keyed to the shaft at 36 and a brake plunger 41 projects upwardly through the platform and carries a brake shoe 32 at its lower end adapted to engage the drum. The upper end of the brake plunger has a head 31 urged upwardly by a spring 34 bearing on the platform to cause the shoe to clear the drum. Flanges 35 on the drum prevent the shoe 32 from becoming displaced relative to the drum.

The spring housing or cup 15, the pinion 13, disc 19 and ratchet 21 are mounted on the axle shaft between collars 37 and 38 on the shaft.

In the operation of the vehicle, the lever 7 is drawn or pushed back by the foot or hand of the operator to the point marked 11. As this movement takes place, the spring 14 is wound up. The lever in moving rearwardly to point 11 engages and rotates the pinion 9 which carries gear 12 in the direction of arrow A to rotate pinion 13 and wind up the spring, the disc 19 rotating with pinion 13, and the wheels being stationary or moving forwardly, the pawl on disc 19 slipping over the ratchet 21.

Upon release of the lever 7, the wound spring will move the pinion 13 and disc 19 forwardly, the pawl engaging the ratchet to drive the shaft and wheels forwardly and returning the lever to forward position as the spring unwinds.

While the spring is being wound, the vehicle may either be moving forwardly or may be at rest.

In case motion is imparted to the scooter from sources other than the spring, the ratchet will slip freely under the pawl and will not affect the spring, so that free coasting is provided.

The end portion 42 of quadrant 8 is not provided with teeth.

The object of the blank space 42 on quadrant 8 is to allow the gears 9, 12, and 13 to continue rotating forward until the spring 14 becomes exhausted or until it is desired to rewind. The blank space is on a line with the bottom of the teeth.

As the quadrant is carried forward by gear 9, it is carried clear of the teeth at the blank space allowing continued movement of gears 9, 12, 13, as long as the spring remains partly wound.

It is not necessary to put on the brake or otherwise hold the machine while being wound, since no force or power is possible from the spring until the lever is released allowing the spring to start unwinding. For this reason, it is possible and desirable that the lever can be depressed, winding spring at the same time the machine is in motion forward. It can in no way interfere with coasting or being carried by momentum, as the pawl slides over ratchet in rearward movement. The ratchet and wheels can also be moving forward at the same instant. The operator may govern his speed by merely arresting or depressing the lever and holding it in depressed position with the teeth of quadrant 8 meshing with pinion 9. This automatically locks and holds the gears and keeps the spring from unwinding, allowing the ratchet to slip under the pawl and the machine to coast forward not under power of the spring until the lever is released again.

This I consider a great advantage, that the spring motor can be wound while the machine is moving forward and will not interfere with operation other than having the spring power stopped at that instant of holding lever depressed.

All machinery shall be covered with a suitable housing (not shown), to protect from breakage and dirt.

I do not wish to limit myself to the form of machine that must be operated by the foot of a standing operator, as I realize that my motor can be adapted to wind by either hand or foot by a sitting or standing operator, without changing the principle of my invention.

I claim:

1. In an occupant propelled vehicle, spring means for driving said vehicle, and winding means for said spring including a lever and means operated by said lever for winding the spring by a single stroke of the lever in one direction the spring unwinding upon release of the lever to drive the vehicle.

2. An occupant propelled vehicle comprising in combination with a chassis frame having front and rear wheels and steering means, a platform on said frame, spring means for driving the rear shaft and wheels forwardly, and winding means for said spring including a lever and multiplying gearing operated by said lever for completely winding the spring upon single rearward stroke of the lever, said spring unwinding upon release of the lever to drive the shaft and lever forwardly to forward position of the lever.

3. An occupant propelled vehicle according to claim 2 in which said multiplying gearing includes a gear on the lever, a pinion connected with said spring, and gearing intermediate the gear on the lever and the spring pinion comprising an intermediate gear meshing with said spring pinion and a pinion secured to said intermediate gear and meshing with said lever gear.

4. An occupant propelled vehicle according to claim 2 in which said multiplying gearing operates a pinion connected to the spring to wind the same, said spring being connected to a housing fixed in the frame, said pinion loosely receiving said shaft, a pawl on said pinion, and a ratchet wheel keyed to the shaft and cooperating with said pawl to permit winding of the spring independently of the shaft and to cause the shaft and wheels to be driven forwardly by the wound spring.

5. An occupant propelled vehicle comprising in combination with a chassis frame having a front wheel with steering means and rear wheels, a flat platform on said frame adapted for a standing operator, a shaft for said rear wheels, one wheel being fixed and the other loose on said shaft, a coiled spring for driving said shaft and wheels forwardly, said spring surrounding said shaft, a housing for said spring fixed to said frame, the outer end of the spring being secured to said housing, winding means for said spring comprising a foot or hand lever pivoted to said frame for forward and backward movement about said pivot, a segmental gear on said lever, a pinion on said frame meshing with said lever gear, an intermediate gear rigidly secured to said pinion, a second pinion loosely mounted on said shaft and meshing with said intermediate gear, said second pinion having a spindle secured to the inner end of said coiled spring, a disc rigidly secured to said second pinion, a pawl on said disc, a ratchet wheel fixed to said shaft and cooperating with said pawl to permit complete winding of the spring independently of the shaft by rearward movement of the lever and to cause the lever, shaft, and wheels to be driven forwardly by the wound spring, a brake drum on said shaft and a foot-operated brake shoe with a plunger extending vertically from said shaft through said platform and a spring engaging the top of said platform and urging the plunger upwardly.

In testimony whereof, I affix my signature.

LOUIS F. CLEMENTS.